US009931993B2

(12) United States Patent
Ward et al.

(10) Patent No.: US 9,931,993 B2
(45) Date of Patent: Apr. 3, 2018

(54) ACCESSORY ADAPTER BRACKET (75) Inventors: Brian Wayne Ward, Swartz Creek, MI (US); Gail Rae Matheus, Salem, MI (US); Sean Michael Phillips, Huntsville (CA)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 13/435,658

(22) Filed: Mar. 30, 2012

(65) Prior Publication Data
US 2013/0032679 A1 Feb. 7, 2013

Related U.S. Application Data (60) Provisional application No. 61/515,670, filed on Aug. 5, 2011.

(51) Int. Cl.
| | |
|---|---|
| *B60R 9/10* | (2006.01) |
| *B60R 9/06* | (2006.01) |
| B60R 9/058 | (2006.01) |
| B60R 9/08 | (2006.01) |
| B60R 9/12 | (2006.01) |
| F16B 2/12 | (2006.01) |

(52) U.S. Cl.
CPC ............... *B60R 9/06* (2013.01); *B60R 9/10* (2013.01); *B60R 9/058* (2013.01); *B60R 9/08* (2013.01); *B60R 9/12* (2013.01); *F16B 2/12* (2013.01)

(58) Field of Classification Search
CPC ............ B60R 9/10; B60R 9/045; B60R 9/048
USPC ........... 248/214, 231.6, 316.6; 280/769, 762, 280/727; 403/381; 224/315, 325, 324, 224/322, 924, 424; 180/89.11; 211/19, 211/20
See application file for complete search history.

(56) References Cited

U.S. PATENT DOCUMENTS

| | | | | |
|---|---|---|---|---|
| 4,483,471 A | * | 11/1984 | Prosen | .......................... 224/314 |
| 4,662,590 A | * | 5/1987 | Hungerford, Jr. | .............. 248/72 |
| 4,681,247 A | * | 7/1987 | Prosen | .......................... 224/322 |
| 4,768,692 A | | 9/1988 | Schneider | |
| 5,064,335 A | | 11/1991 | Bergeron et al. | |
| 5,201,911 A | | 4/1993 | Lee | |
| 5,332,183 A | * | 7/1994 | Kagayama | ............... 248/222.13 |
| 5,358,162 A | | 10/1994 | Hill | |
| 5,380,326 A | * | 1/1995 | Lin | ............................... 606/330 |
| 5,624,063 A | * | 4/1997 | Ireland | .......................... 224/324 |

(Continued)

OTHER PUBLICATIONS

International Search Report and the Written Opinion of the International Searching Authority, PCT/US2012/049151, Cequent Performance Products, Inc., Oct. 25, 2012.

(Continued)

*Primary Examiner* — Nkeisha Smith
(74) *Attorney, Agent, or Firm* — McDonald Hopkins LLC (57) ABSTRACT

An accessory adapter capable of attaching to a cargo accessory management system is shown and described. The accessory adapter may include a body member and a clamping member attached to the body member, where a portion of the cargo accessory management system is capable of being wedgingly secured between the clamping member and body member. The accessory adapter may also include an accessory adapter body selectively attached to the body member, where the accessory adapter body is capable of securing an accessory to the cargo accessory management system.

34 Claims, 8 Drawing Sheets

(56) References Cited

U.S. PATENT DOCUMENTS

| | | | |
|---|---|---|---|
| 5,730,343 A * | 3/1998 | Settelmayer | 224/321 |
| 5,769,292 A * | 6/1998 | Cucheran et al. | 224/324 |
| 5,848,743 A | 12/1998 | Derecktor | |
| 5,862,966 A | 1/1999 | Mehls | |
| 5,931,359 A * | 8/1999 | Zona | 224/321 |
| 5,996,869 A | 12/1999 | Belinky et al. | |
| 6,112,965 A * | 9/2000 | Lundgren | 224/322 |
| 6,152,341 A | 11/2000 | LeMay et al. | |
| 6,370,741 B1 * | 4/2002 | Lu | 24/523 |
| 6,425,508 B1 * | 7/2002 | Cole et al. | 224/320 |
| 6,425,509 B1 * | 7/2002 | Dean et al. | 224/324 |
| 6,446,922 B2 * | 9/2002 | Irie | 248/230.1 |
| 6,494,351 B1 * | 12/2002 | Dean | 224/324 |
| 6,622,898 B1 * | 9/2003 | Wang | 224/321 |
| 6,789,557 B1 * | 9/2004 | Wahl, Jr. | 135/154 |
| 6,851,590 B2 * | 2/2005 | Dean | 224/324 |
| 6,868,998 B2 * | 3/2005 | Dean | 224/324 |
| 6,892,913 B1 * | 5/2005 | Andersson | 224/319 |
| 7,118,016 B1 * | 10/2006 | Kolda | 224/500 |
| 7,237,704 B2 * | 7/2007 | Dean | 224/324 |
| 7,401,715 B2 * | 7/2008 | Edgerly | 224/42.26 |
| 7,562,855 B2 * | 7/2009 | Oetlinger | 248/316.6 |
| 7,647,676 B2 * | 1/2010 | Carnevali | 24/523 |
| 7,726,529 B2 * | 6/2010 | Foley | 224/324 |
| 8,113,397 B2 | 2/2012 | Magnusson | |
| 8,176,603 B2 * | 5/2012 | Carnevali | 24/523 |
| 8,196,789 B2 * | 6/2012 | Kraeuter et al. | 224/315 |
| 8,267,293 B2 | 9/2012 | Liu | |
| 8,366,341 B2 * | 2/2013 | Bevirt | 403/381 |
| 8,393,508 B2 * | 3/2013 | Sautter et al. | 224/325 |
| 8,490,937 B2 * | 7/2013 | Crain et al. | 248/316.6 |
| 8,496,145 B2 * | 7/2013 | Sautter et al. | 224/315 |
| 8,505,793 B2 * | 8/2013 | Foley | 224/324 |
| 2003/0071097 A1 * | 4/2003 | Dean | 224/319 |
| 2005/0035167 A1 | 2/2005 | Threet et al. | |
| 2005/0263554 A1 * | 12/2005 | Naslund et al. | 224/319 |
| 2010/0078454 A1 * | 4/2010 | Sautter et al. | 224/315 |
| 2011/0132946 A1 | 6/2011 | Sautter et al. | |
| 2011/0139841 A1 | 6/2011 | Sautter et al. | |
| 2011/0303711 A1 * | 12/2011 | McMillan | 224/310 |
| 2012/0018977 A1 | 1/2012 | Stanifer et al. | |
| 2012/0018978 A1 | 1/2012 | McCoy et al. | |
| 2012/0018979 A1 | 1/2012 | McCoy et al. | |
| 2013/0032679 A1 | 2/2013 | Ward et al. | |

OTHER PUBLICATIONS

International Search Report and the Written Opinion of the International Searching Authority, PCT/US2012/049521, Cequent Performance Products, Inc., Oct. 22, 2012.

* cited by examiner

ACCESSORY ADAPTER BRACKET

CROSS-REFERENCE TO RELATED APPLICATION

This application claims the benefit of U.S. Provisional Patent Application No. 61/515,670, entitled "Accessory Adapter Bracket," filed on Aug. 5, 2011, which is hereby incorporated in its entirety by reference.

TECHNICAL FIELD

The present invention generally relates to an accessory adapter bracket and, more particularly, to an accessory adapter bracket capable of being secured to a cargo management system.

BACKGROUND

Vehicles are available in many different shapes and sizes. Vehicles, regardless of their shape or size have a limit on the amount of cargo space available within the vehicle. In order to expand upon this limited cargo space, cargo management systems have been developed to help create additional cargo capacity for a vehicle. These cargo management systems are typically capable of carrying additional items in a predetermined manner, relieving vehicles of some of their cargo restraints.

Many of the available cargo management systems attach to the exterior of the vehicle and carry items outside of the vehicle. For example, there are cargo management systems that attach to roofs of vehicles, on luggage racks, in the load bed of a vehicle, and the like—each of which may carry items on the exterior of the vehicle.

Most cargo management systems have a single specified use associated with them. For example, cargo baskets that attach to a roof of a vehicle are typically only used to carry and store items within the basket. Typically, the cargo baskets are not used for and are not capable of being used for any other purpose. This may result in having to remove the cargo basket whenever a different item is to be transported that is either not intended to be transported in a cargo basket or otherwise does not fit. Moreover, this may limit the amount of functional usage of the cargo basket. Similarly, other cargo management systems typically are designed for a single use and require removal whenever the attached cargo management system is incapable of meeting the needed or desired use.

However, installing and uninstalling cargo management systems from vehicles can often be time consuming and difficult. Moreover, finding a location to store the cargo management system when not in use can likewise be difficult. Therefore, there is a need for a solution that can be used with an existing cargo management system to expand upon its capable usages so that it can be used to transport many different items, not just those for which it is initially intended. Moreover, there is a need for a system that is relatively easy to attach to an appropriate cargo management system and will generally not interfere with the intended use of the cargo management system.

SUMMARY

An accessory adapter capable of attaching to a cargo accessory management system is shown and described. The accessory adapter may include a body member and a clamping member attached to the body member, where a portion of the cargo accessory management system is capable of being wedgingly secured between the clamping member and body member. The accessory adapter may also include an accessory adapter body selectively attached to the body member, where the accessory adapter body is capable of securing an accessory to the cargo accessory management system.

An accessory adapter capable of attaching to a cargo accessory management system capable of attaching to a vehicle may include a first clamping member and a second clamping member selectively attachable to the first clamping member, where the cargo accessory management system is capable of being secured between the first and second clamping members. The accessory adapter may also include an accessory member selectively attachable to the first clamping member, where the accessory member is capable of securing an accessory.

An accessory adapter capable of being selectively attached to a cargo management system may include a body having first and second attachment members and a clamping device having a third attachment member, where the third attachment member is capable of selectively attaching to the first attachment member. The accessory adapter may also include an accessory holding device having a fourth attachment member, where the fourth attachment member is capable of selectively attaching to the second attachment member, and where the accessory holding device is capable of holding an accessory.

DESCRIPTION OF THE DRAWINGS

The operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
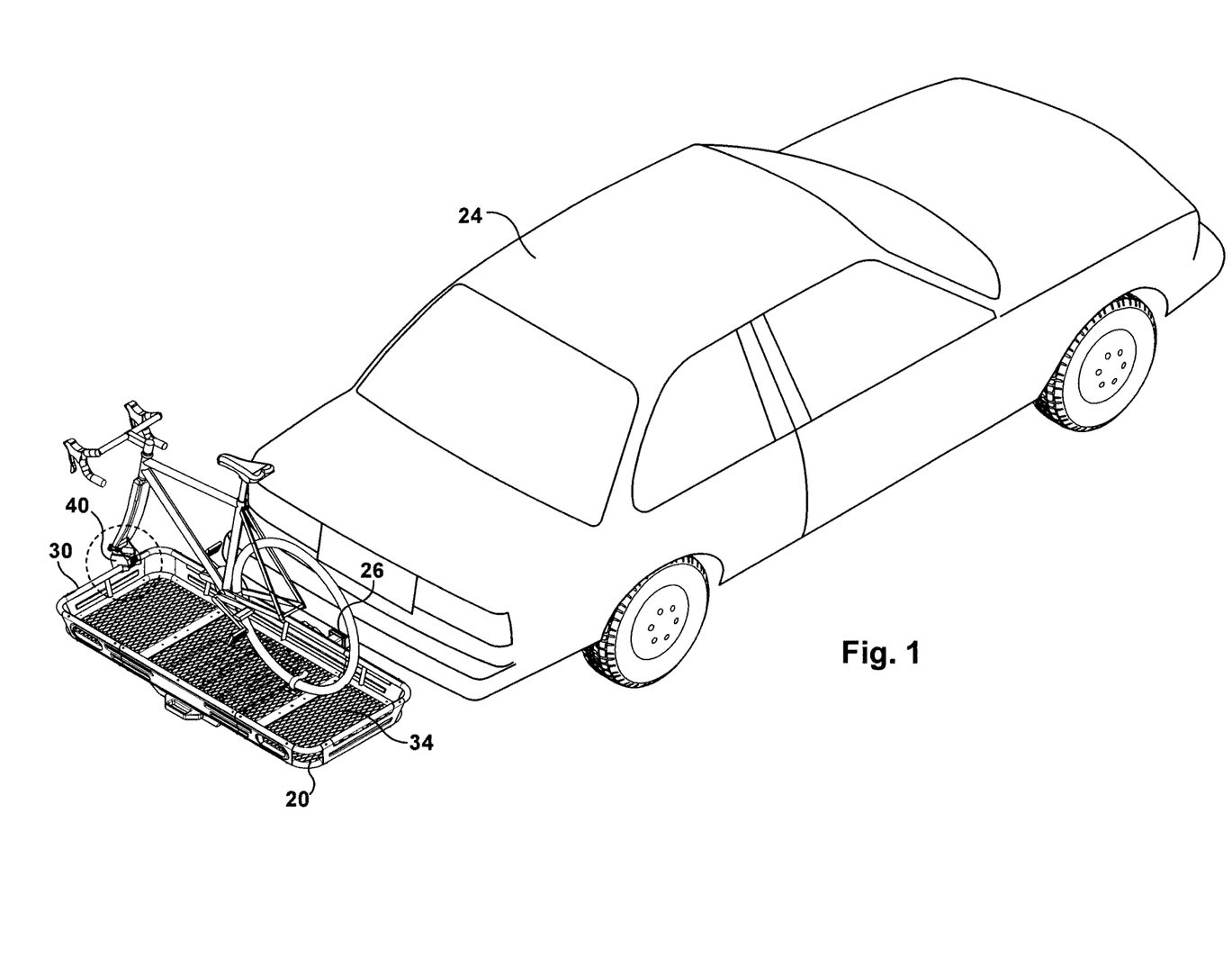
FIG. 1 is a perspective view of a cargo accessory management system attached a rear of a vehicle with an accessory adapter bracket attached thereto selectively securing a bicycle to the cargo accessory management system.
Figure 2:
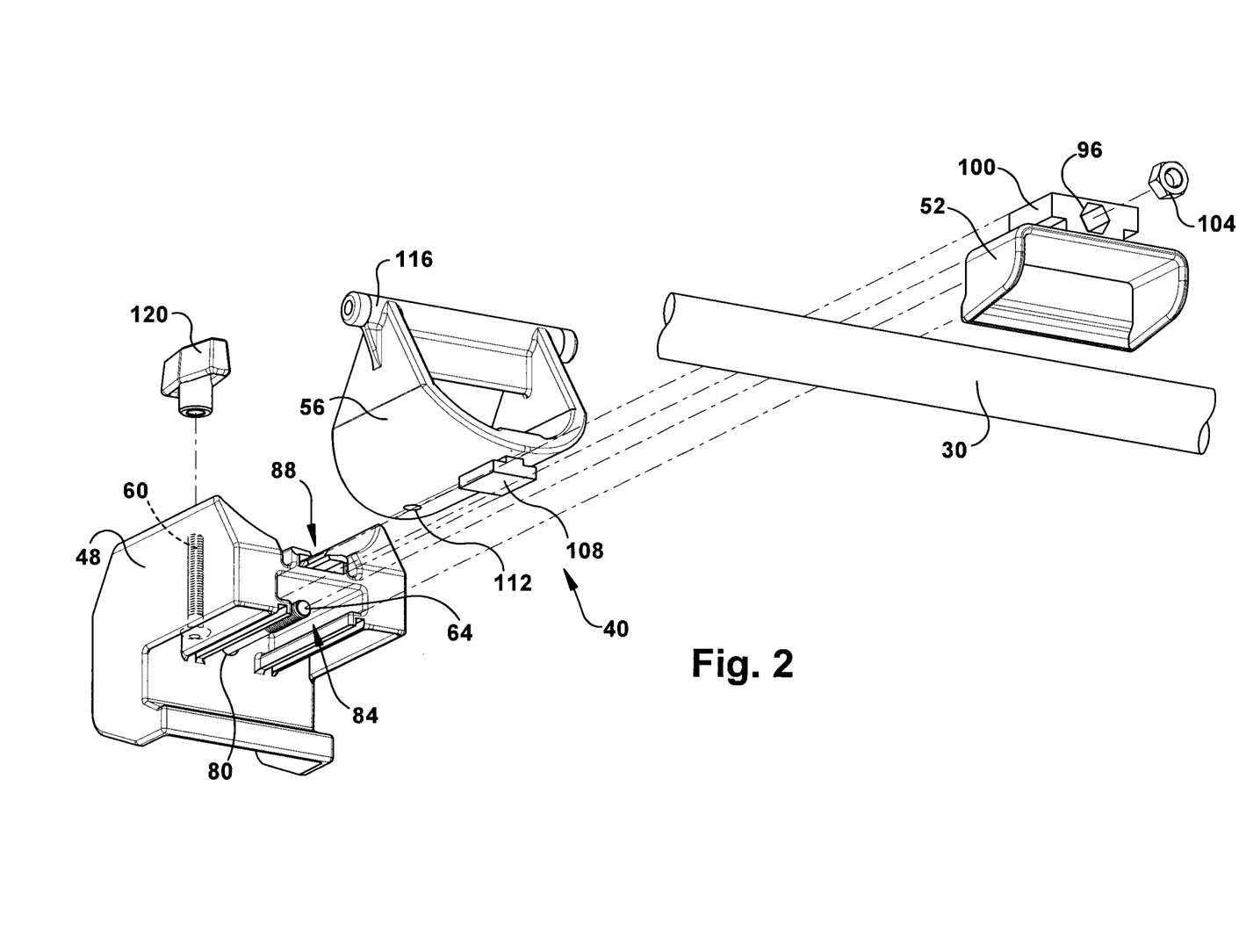
FIG. 2 is a partial perspective view of a portion of the cargo accessory management system with an exploded view of an accessory adapter bracket.
Figure 3:
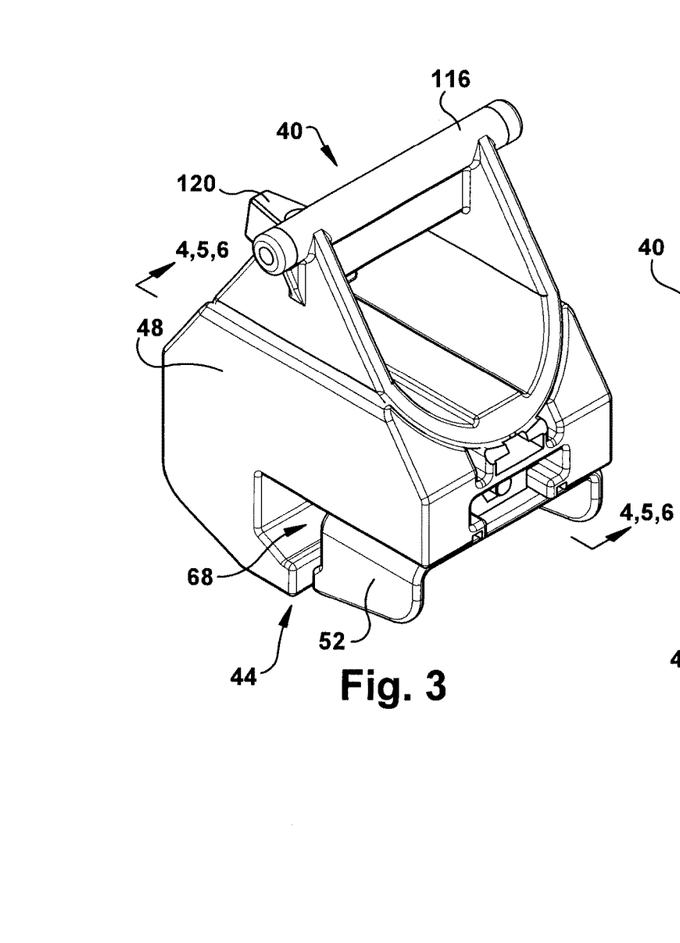
FIG. 3 is a perspective view of the accessory adapter bracket of FIG. 2.
Figure 4:
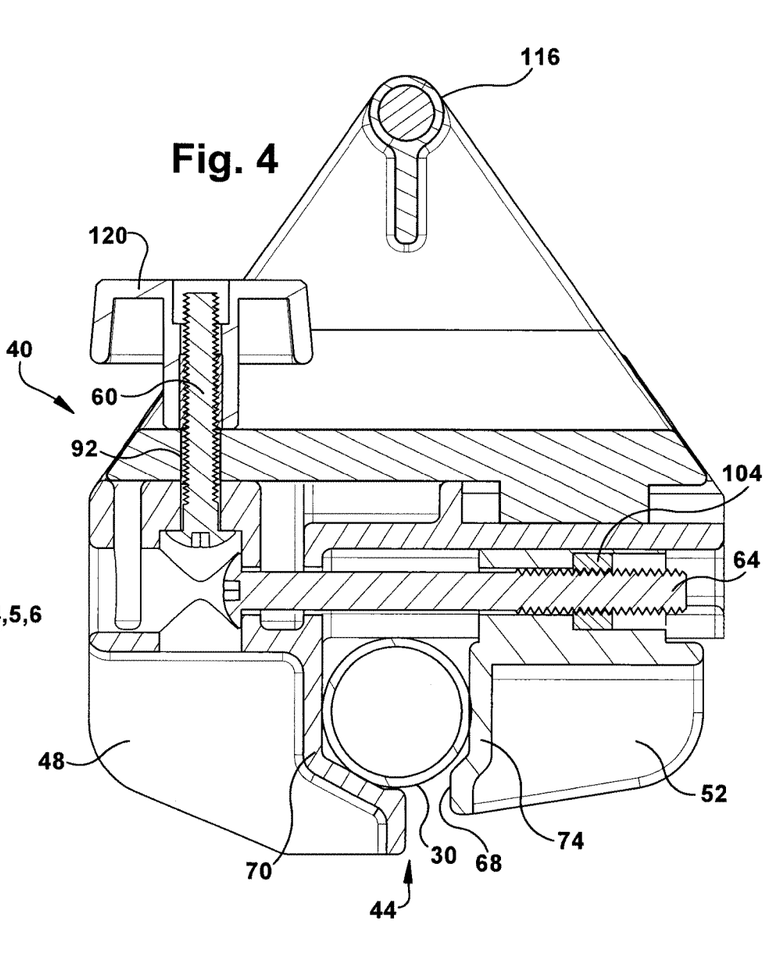
FIG. 4 is a cross-sectional view of a portion of the cargo accessory management system with an accessory adapter bracket attached thereto taken along line 4-4 of FIG. 3.
Figure 5:
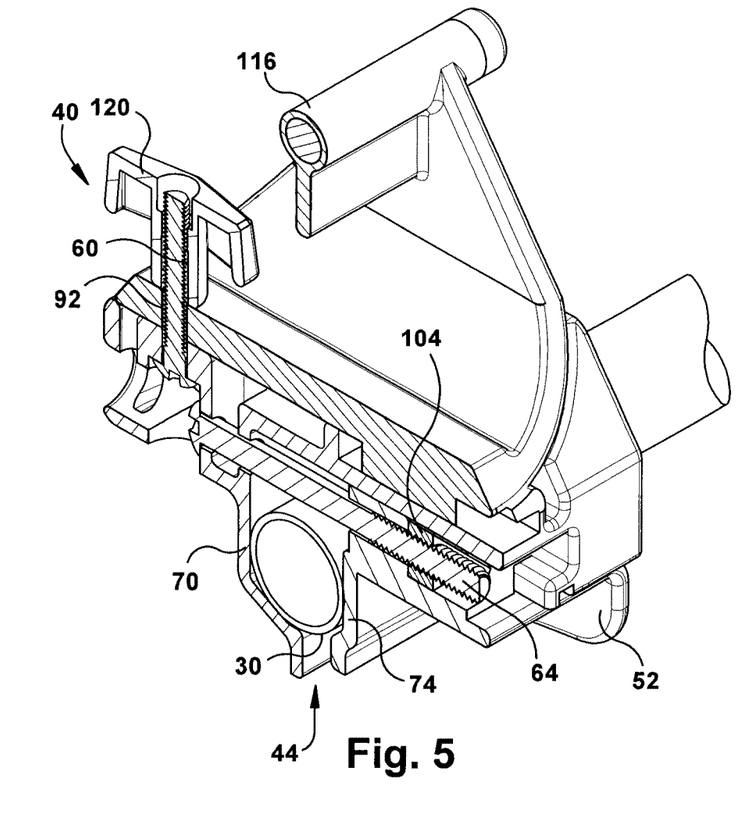
FIG. 5 is a cross-sectional perspective view of a portion of the cargo accessory management system with an accessory adapter bracket attached thereto taken along line 5-5 of FIG. 3.
Figure 6:
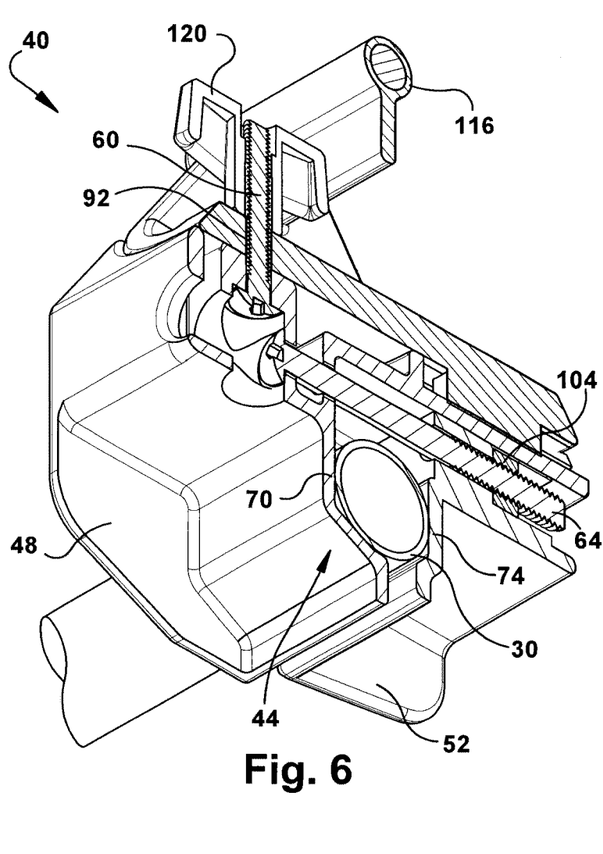
FIG. 6 is a partial cross-sectional perspective view of a portion of the cargo accessory management system with an accessory adapter attached thereto taken along line 6-6 of FIG. 3.
Figure 7:
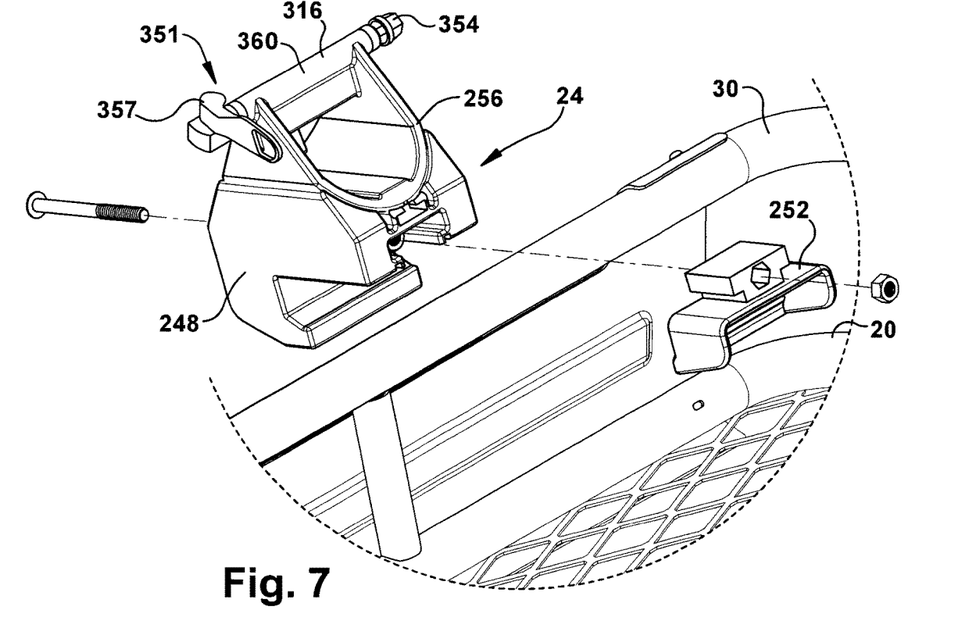
FIG. 7 is a perspective view of an accessory adapter bracket being attached to a cargo accessory management system.
Figure 8:
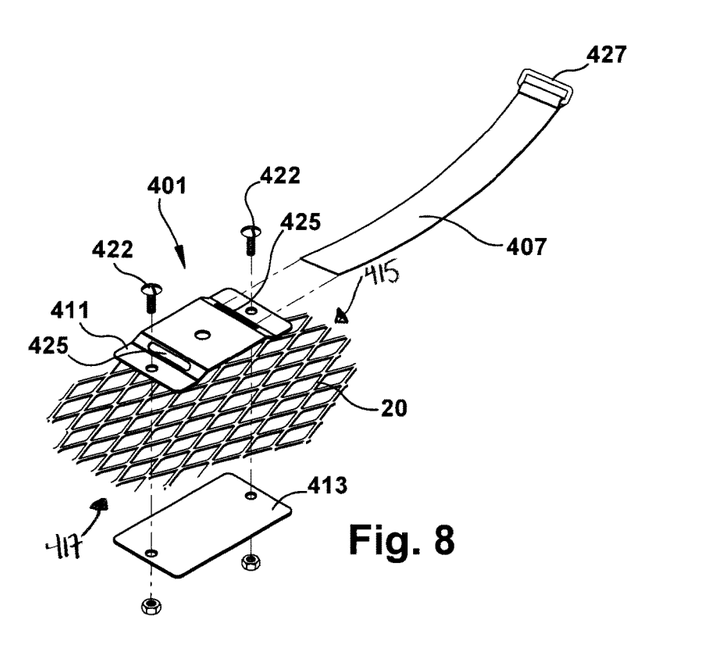
FIG. 8 is an exploded view of a rear bracket and strap assembly being attached to a cargo accessory management system.
Figure 9:
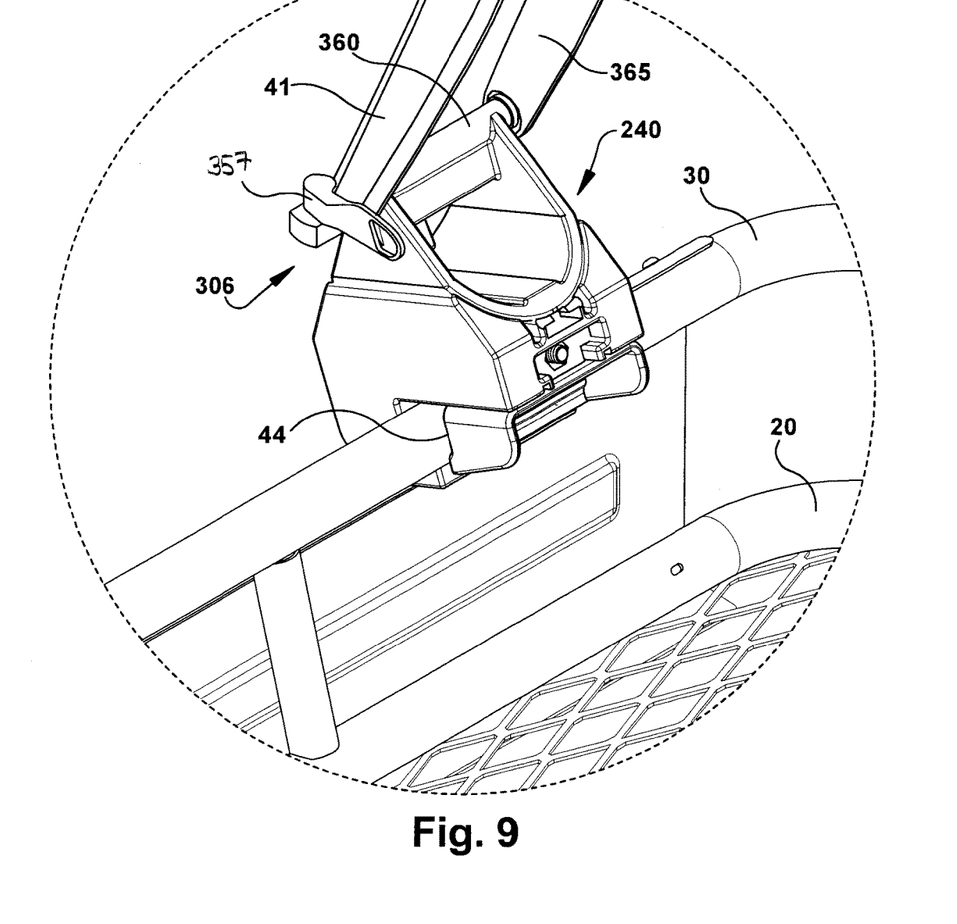
FIG. 9 is a perspective view of a portion of a bicycle being attached to an accessory adapter bracket attached to a cargo accessory management system.

A cargo management system, such as for example a cargo basket 20 shown in the drawings, may be capable of being attached to a vehicle 24 in any appropriate manner. By way of a non-limiting example, the basket 20 may be capable of attaching to a rear mounted hitch mounting system 26 of a vehicle 24, as is shown in FIG. 1. The cargo basket 20 may be capable of attaching to the vehicle 24 in any manner and should not be limited by such. While the basket 20 is shown in the drawings, it should be understood that the present teachings are not limited to cargo baskets, but may apply to any kind of cargo management system, including, without limitation those cargo management systems that may be capable of attaching to a vehicle. By way of non-limiting examples, the cargo management system may include a roof rail, other cargo baskets (such as roof mounted cargo baskets), platforms, load bed rails and the like. Moreover, while the cargo basket 20 is shown as being capable of attaching to the rear mounted hitch mounting system 26 of the vehicle 24, it is not limited to such and may attach to any appropriate portion of a vehicle, such as for example, the trunk, roof, load bed, or the like.

By way of a non-limiting example, the cargo basket 20 may include rails 30. The rails 30 may be assembled from separate rail components, integrally formed from a single rail, or a combination thereof. The rails 30 may have any appropriate cross sectional shape, such as by way of a non-limiting example being generally circular, oval, square, rectangular and the like. The cargo basket 20 may further include a storage compartment 34. The storage compartment 34 may be capable of holding and transporting any appropriately sized and shaped items there within and may be of any appropriate shape and size.

At least one accessory adapter bracket 40 may be selectively attached to the rails 30 at any appropriate position on the rails 30. While the drawings show one such accessory adapter bracket 40 being used, any number of accessory adapter brackets 40 may be used depending upon the desired use thereof. The accessory adapter brackets 40 may allow accessories or other items to be mounted to the cargo basket 20, including, without limitation to the rails 30 thereof. The accessory adapter brackets 40 may act as an attachment point on any appropriate position on the rails 30 of the cargo basket 20 while generally preventing the item it may be carrying from blocking useable cargo space within the storage compartment 34 of the cargo basket 20. By way of a non-limiting example, the accessory adapter brackets 40 may be capable of securing and carrying a bicycle 41 to the cargo basket 20 while leaving a substantial portion of the storage compartment 34 of the cargo basket 20 accessible to a user. The accessory adapter bracket 40 may also secure thereto an item that may further utilize the cargo management system, such as the cargo basket 20, in an appropriate manner to generally carry and hold the item secured to the accessory adapter bracket 40.

The accessory adapter bracket 40 may include a clamping feature 44 that may be capable of selectively attaching the accessory adapter bracket 40 to the appropriate rail 30 in any appropriate manner. By way of a non-limiting example, the clamping feature 44 may include a main body 48 and a clamping body 52. The accessory adapter bracket 40 may also include an accessory adapter body 56 that may be selectively attachable to the clamping feature 44. By way of a non-limiting example, the accessory adapter body 56 may be selectively attachable to the main body 48 of the clamping feature 44. The accessory adapter body 56 may be capable of securing an item to the cargo management system, such as the cargo basket 20, such as by way of a non-limiting example, securing the bicycle 41 to the cargo basket 20, as further described below. Alternatively, the accessory adapter body 56 may be selectively attachable to the clamping body 52, may be selectively attachable to both the main body 48 and the clamping body 52, or may be capable of selectively attaching to both of the main body 48 and the clamping body 52.

The main body 48 may be selectively attached to the clamping body 52 in any appropriate manner and the accessory adapter body 56 may be selectively attached to the main body 48 (or the clamping body 52, or both, as applicable) in any appropriate manner. The accessory adapter bracket 40 may further include a first fastener 60 that may selectively attach the main body 48 with the accessory adapter 56. The accessory adapter bracket 40 may also include a second fastener 64 that may selectively attach the clamp body 52 with the main body 48. In other embodiments, the main body 48 may be integrally formed with the clamping body 52 such that they are either attached, such as through welding, fastening or the like, or may be formed as a single component.

Attaching the main body 48 with the clamping body 52 may wedgingly engage the rail 30 between such to selectively attach the accessory adapter bracket 40 to the cargo basket 20. By way of a non-limiting example, attaching the main body 48 with the clamping body 52 may create a channel 68. The channel 68 may be shaped and sized to fit over and wedgingly engage the rail 30 to secure the accessory adapter bracket 40 to the cargo basket 20 at any appropriate location on the cargo basket 20. By way of a non-limiting example, the main body 48 may include a curved portion 70; likewise, the clamping body 52 may include a curved portion 74. The curved portion 74 of the clamping body 52 may be of substantially the same size and shape as that of the curved portion 70 of the main body 44. In the alternative, only one curved portion 70 or 74 may be included and the other one excluded. In yet another alternative, the curved portions 70, 74 may be of a different shape and size.

The curved portions 70, 74 may, when the main body 48 and clamping body 52 may be attached, be immediately adjacent one another and may form the channel 68. The curved portions 70, 74 may be generally aligned with one another such that the rails 30 may wedgingly fit within the channel 68. The channel 68 may be of a shape and size to wedgingly engage rails 30 of any shape and size not just the generally circular cross-sectional rails 30 shown.

The main body 48 may further include an aperture 80 through which the second fastener 64 may pass. The main body 48 may further include a first generally T-shaped channel or female member 84 and a second generally T-shaped channel or female member 88. While T-shaped channels 84, 88 are shown and described, the channels may be of any appropriate shape and size and are not limited to that described. By way of a non-limiting example, the female members 84, 88 may be of a generally dovetail shape, rectangular shape, V-shape, L-shape and the like. Further, the main body 48 may include a second aperture 92 through which the first fastener 60 may pass.

The clamping body 52 may include an aperture 96 through which the second fastener 64 may pass. The clamping body 52 also may include a generally T-shaped male member 100 that may be shaped and sized to engagingly mate with the first generally T-shaped channel 84 of the main body 48. By way of a non-limiting example, the generally T-shaped male member 100 may slidably engage with the first generally T-shaped channel 84 of the main body 48. While the generally T-shaped male member 100 and the first generally T-shaped channel 84 may be shaped and sized as mating T-shaped members, the present teachings are not limited to such and can be of any appropriate shape and size, not just that shown. By way of a non-limiting example, the mating members 84, 100 may be a female dovetail and male dovetail, respectively, or any kind of member that engages a mating member, including, without limitation slidably engaging members, snap-fit engaging members, or any kind of mating members.

Once the generally T-shaped male member 100 and the generally T-shaped channel 84 are matingly engaged with one another, the second fastener 64 may pass through the aperture 80 of the main body 48 and into the aperture 96 of the clamping body 52. A nut 104 may be secured to the second fastener 64, which may selectively secure the main body 48 with the clamping body 52 to generally secure the adapter bracket 40 to the rails 30. In these embodiments, the rails 30 may wedgingly fit within the channel 68, selectively securing the accessory adapter bracket 40 with the cargo basket 20.

The accessory adapter body 56 may include a generally T-shaped male member 108, an aperture 112 and an accessory mounting portion 116. The generally T-shaped male member 108 may matingly engage with the second generally T-shaped channel 88 of the main body 48. While the generally T-shaped male and female members 108, 88 are shown and described, any appropriately shaped and sized mating members may be used. By way of a non-limiting example, the mating members 88, 108 may be a female and male dovetail member, respectively, or any kind of member that engages a mating member, including, without limitation slidably engaging members, snap-fit engaging members, or any kind of mating members.

Once the generally T-shaped male member 108 and the generally T-shaped channel 88 may be matingly engaged with one another, the fastener 60 may pass through the aperture 92 of the main body 48 and into the aperture 112 of the accessory adapter body 56. A nut 120, which may be shaped as a winged nut to assist with holding such, may be secured to the fastener 60 securing the main body 48 with the accessory adapter body 56 and securing the accessory mounting portion 116 to the cargo basket 20. While the nut 120 is shown and described as a wing nut, the present teachings are not limited to such and the nut may be of any appropriate shape, size and kind.

The accessory mounting portion 116 may be of any appropriate shape and size to generally secure and carry any appropriate accessory. As shown in the drawings, the accessory mounting portion 116 may be capable of holding and securing the bicycle 41, but should not be limited to such. The accessory mounting portion 116 may be of any appropriate shape and size, including, without limitation, generally rectangular, square, diamond, frustoconical, conical, and the like. Moreover, by way of a non-limiting example, the accessory mounting portion 116 may be capable of generally securing and carrying accessories such as kayaks, skis, canoes, luggage, strollers, coolers, and the like.

The accessory adapter bracket 40 may be capable of selectively securing the bicycle 41 to the cargo basket 20. To attach the accessory adapter bracket 40 to the cargo basket 20, a wrench may be used to loosen the fastener 64. Once loosened, clamping body 52 may be at least partially disengaged from the main body 48 by at least partially slidably disengaging the male member 100 from the female member 84. The accessory adapter bracket 40 may then be placed onto the rail 30 of the cargo basket 20. Once appropriately positioned, the wrench may be used to tighten the fastener 64 selectively securing the accessory adapter bracket 40 to the rail 30 of the basket 20. The accessory adapter bracket 40 may be capable of selectively securing to the rail 30 of the basket 20 any an appropriate angle to account for the type and number of bicycles being attached to the basket 20.

Upon selective attachment of the main body 48 and clamping body 52 or prior to such selective attachment, the accessory adapter body 56 may be selectively attached to the attached main body 48 and clamping body 52 as appropriate. Additionally, the accessory adapter body 56 may be removed from the attached the main body 48 and clamping body 52, while they remain attached to the cargo basket 20. This may further allow for modularity for the accessory adapter bracket 40.

Additional embodiments of an accessory adapter bracket according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a accessory adapter assembly without departing from the spirit and scope of the present teachings.

In other embodiments, an accessory adapter body 256 of an accessory adapter bracket 240 may utilize an accessory mounting portion 316 of a different design that may be selectively attached to the main body 248 and clamping body 252 as previously described. This may allow any appropriate kind of accessory mounting portion to be attached to the main body 48 and clamping body 52 forming the appropriate accessory adapter bracket to hold the appropriate item to the appropriate cargo management system, such as the cargo basket 20 shown. In some embodiments, the accessory adapter bracket 240 may include the accessory adapter body 256 having the accessory mounting portion 316 shown as the bicycle holder. In these embodiments, this accessory adapter body 256 and accessory mounting portion 316 may be capable of being removed from the main body 248 and clamping body 252 and replaced with the accessory adapter body 256 and accessory mounting portion 116 set forth above. In addition, the accessory adapter body 256 having the accessory mounting portion 316 may be replaced with another accessory adapter body having a different accessory mounting portion capable of securing a different item to the cargo basket 20 or other cargo accessory management system. This may create modularity for the accessory adapter bracket 40 and 240.

In some embodiments, the accessory mounting portion 316 may include a skewer clamp lever 351 that may be selectively secured with the adapter body 256. In these embodiments, the skewer clamp lever 351 may include a nut 354 on one end thereof, a handle 357 on an opposite side thereof, and a body portion 360 between such. The handle 357 may be capable of biasing from on open position to a closed position. In the open position, the handle 357 may be capable of being rotated and the nut 354 and handle 357 may be selectively repositioned relative to the body portion 360 away from each. This may allow a fork 365 of the bicycle 41 being capable of being positioned between the nut 354 and the handle 357. The handle 357 may then be rotated in the opposite direction such that the nut 354 and handle 357 may be selectively positioned toward each other and may generally tighten the fork 365 of the bicycle 41 to the accessory mounting portion 316.

In some embodiments, the accessory adapter bracket 240 may include a rear tire bracket 401 and strap assembly 407. The rear tire bracket 401 and strap assembly 407 may be utilized to assist with selectively securing the bicycle 41 to the cargo basket 20. In these embodiments, the rear tire bracket 401 and strap assembly 407 may be attached to the cargo basket 20 in any appropriate manner. In some embodiments, the rear tire bracket 401 may include a top bracket 411 and a bottom bracket 413, whereby the top bracket 411 and bottom bracket 413 may be selectively attached to one another.

In these embodiments, a distance between a front wheel axle of the bicycle 41 to a rear wheel axle of the bicycle 41 may be measured and noted. Next, the rear tire bracket 401 and strap assembly 407 may be positioned in the cargo basket 20 an appropriate distance based upon this measured distance. The top bracket 411 may be positioned on a top surface 415 of the cargo basket 20 and the bottom bracket 413 may be positioned on a bottom surface 417 of the cargo basket 20 immediately below the top bracket 411. The top bracket 411 and bottom bracket 413 may be selectively secured to one another with the cargo basket 20 positioned between them by utilizing fasteners 422. Further, the top bracket 411 may include a strap aperture 425, which may be shaped and sized to accept therethrough at least a portion of the strap assembly 407. In these embodiments, the strap assembly 407 may include an aperture 427, or a looped end that may similarly be shaped and sized to accept the remainder of the strap assembly 407. The strap assembly 407 may be capable of being inserted through the strap aperture 425 and then through the loop 427, which may selectively secure the strap assembly to the top bracket 411 and may selectively secure the rear tire of the bicycle 41 to the cargo basket 20. In other embodiments, the strap assembly 407 may not be utilized, but instead a bungee cord, or other securing device may be utilized.

Figure 10:
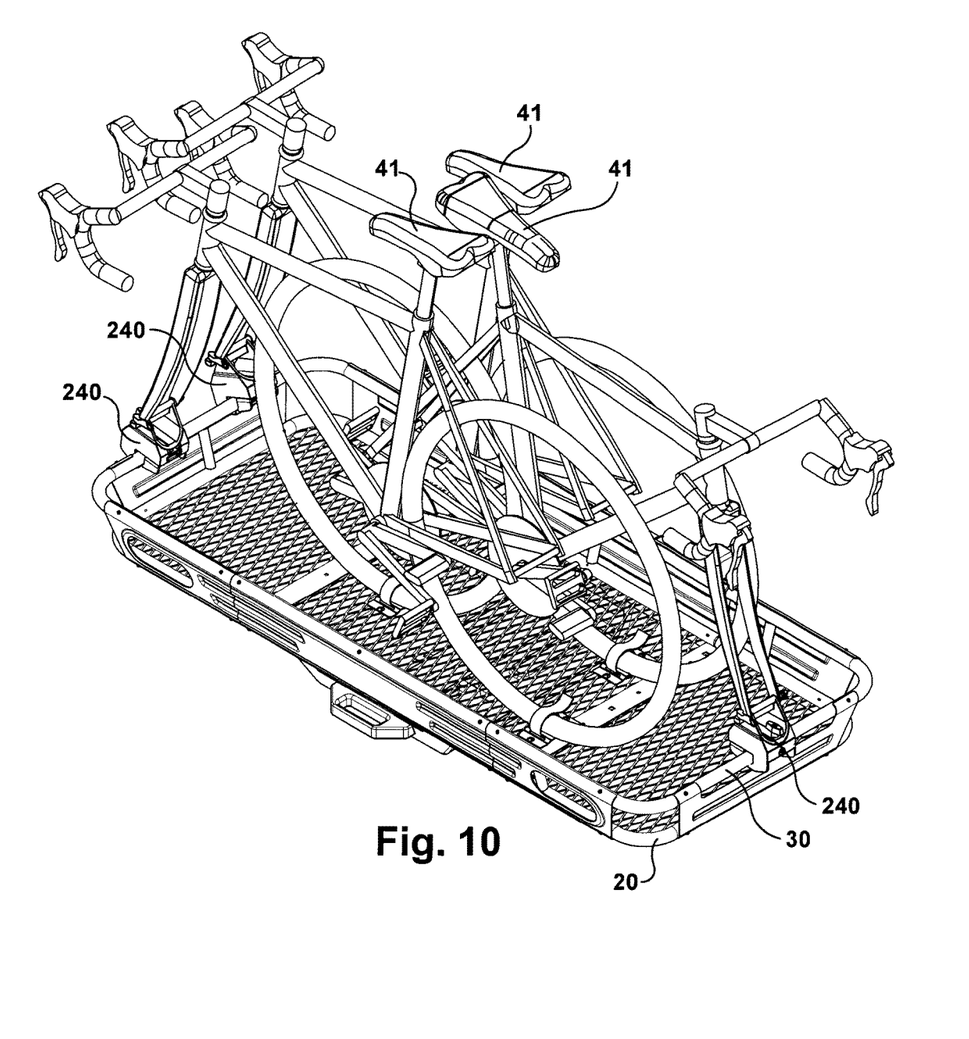
FIG. 10 is a perspective view of embodiments of a plurality of accessory adapter brackets attached to a cargo accessory management system carrying a plurality of bicycles.

Still further, a plurality of accessory adapter brackets 240 may be attached to the cargo basket such that a plurality of bicycles 41 may be attached to the cargo baskets, such as shown in FIG. 10. As shown three accessory adapter brackets 240 may be utilized such that three bicycles may be attached to the cargo basket 20. While three such accessory adapter brackets 240 and bicycles 41 are shown any number of such may be used without departing from the present teachings.

Figure 11:
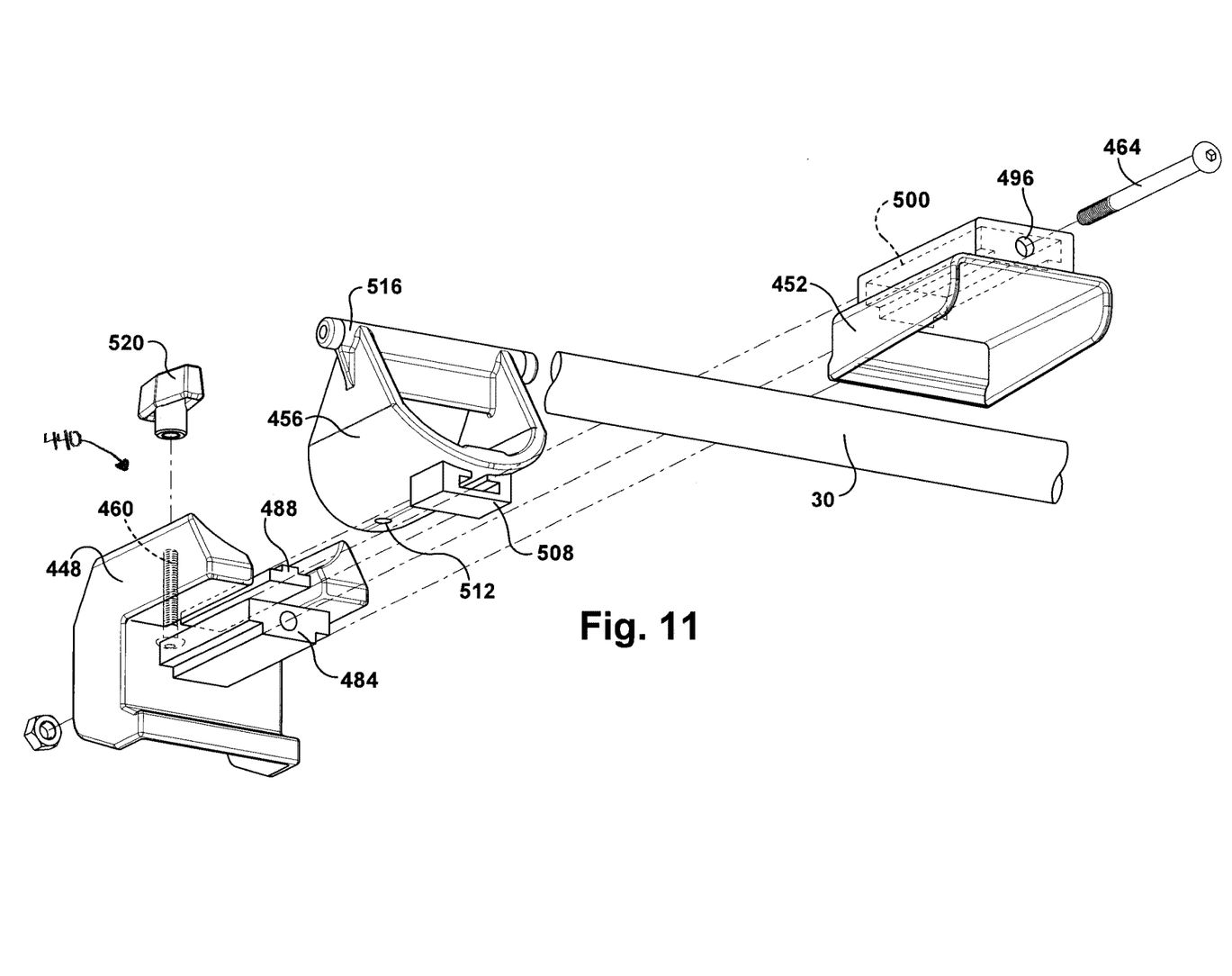
FIG. 11 is a partial perspective view of a portion of the cargo accessory management system with an exploded view of an accessory adapter bracket.

In other embodiments, an example of which is shown in FIG. 11, an accessory adapter bracket 440 may include a main body 448 that may be selectively attached to a clamping body 452 in any appropriate manner. The accessory adapter bracket 440 may also include an accessory adapter body 456 that may be selectively attached to the main body 448 (or the clamping body 452, or both, as applicable) in any appropriate manner. The accessory adapter bracket 440 may further include a first fastener 460 that may selectively attach the main body 448 with the accessory adapter 456. The accessory adapter bracket 440 may also include a second fastener 464 that may selectively attach the clamp body 452 with the main body 448.

The main body 48 may further include a first male member 484 and a second male member 488—the male members 484, 488 may be of any appropriate shape and are not limited that shown. By way of a non-limiting example, the male members 484, 488 may be of a generally male dovetail shape, a T-shape, a V-shape, a rectangular shape with slots, or any other appropriate shape.

The clamping body 452 may include a female member 500, which may include a generally T-shaped channel that may be shaped and sized to engagingly mate with the first male member 484 of the main body 448. By way of a non-limiting example, the first generally T-shaped male member 484 may slidably engage with the generally T-shaped female member 500 of the clamping body 452. While the generally T-shaped female member 500 and the first generally T-shaped male member 484 may be shaped and sized as mating T-shaped members, the present teachings are not limited to such and can be of any appropriate shape and size, not just that shown. By way of a non-limiting example, the mating members 484, 500 may be a male dovetail and female dovetail, respectively, or any kind of member that engages a mating member, including, without limitation slidably engaging members, snap-fit engaging members, or any kind of mating members.

Once the first generally T-shaped male member 484 and the generally T-shaped channel 500 are matingly engaged with one another, a second fastener 464 may pass through the aperture of the main body 448 and into the aperture 496 of the clamping body 452.

The accessory adapter body 456 may include a generally T-shaped female member 508, an aperture 512 and an accessory mounting portion 516. The generally T-shaped female member 508 may matingly engage with the second generally T-shaped male member 488 of the main body 448. While the generally T-shaped female and male members 508, 488 are shown and described, any appropriately shaped and sized mating members may be used. By way of a non-limiting example, the mating members 508, 488 may be a female and male dovetail member, respectively, or any kind of member that engages a mating member, including, without limitation slidably engaging members, snap-fit engaging members, or any kind of mating members.

Once the generally T-shaped female member 508 and the generally T-shaped male member 488 may be matingly engaged with one another, the fastener 460 may pass through the main body 448 and into the aperture 512 of the accessory adapter body 456. A nut 520, which may be shaped as a winged nut to assist with holding such, may be secured to the fastener 460 securing the main body 448 with the accessory adapter body 456 and securing the accessory mounting portion 516 to the cargo basket 20.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. An accessory adapter in combination with a cargo accessory basket, the accessory adapter comprising:
   a body member, the body member having a first engaging member monolithically formed with the body member;
   a clamping member attached to the body member, wherein a rail of the cargo accessory basket is wedgingly secured between the clamping member and body member;
   an accessory adapter body removably attached to the first engaging member of the body member, wherein the accessory adapter body secures an accessory to the cargo accessory basket; and
   a strap member spaced from the accessory adapter body and removably securable directly to the cargo accessory basket, the strap member being free of direct connection with the accessory adapter body, wherein the strap member and the accessory adapter body are operatively positioned on the cargo accessory basket to hold the accessory, the strap member and the accessory adapter body being free of an elongated rail member positioned in the cargo accessory basket.

2. The accessory adapter of claim 1, wherein attachment of the clamping member with the body member forms a channel, wherein the cargo accessory basket is wedgingly secured in the channel.

3. The accessory adapter of claim 2, wherein the body member includes a second engaging member.

4. The accessory adapter of claim 3, wherein the clamping member includes a third engaging member, the third engaging member selectively engaging the second engaging member of the body member.

5. The accessory adapter of claim 4, wherein the second engaging member is a generally T-shaped female member.

6. The accessory adapter of claim 5, wherein the third engaging member includes a generally T-shaped male member, the generally T-shaped male member slidingly engaging with the generally T-shaped female member of the body member.

7. The accessory adapter of claim 4, wherein the second engaging member is a female member.

8. The accessory adapter of claim 7, wherein the third engaging member includes a generally T-shaped male member, the generally T-shaped male member slidingly engaging with the female member of the body member.

9. The accessory adapter of claim 4, wherein the accessory adapter body includes a fourth engaging member whereby the fourth engaging member of the accessory adapter body selectively engages the first engaging member of the body member.

10. The accessory adapter of claim 9, wherein the fourth engaging member of the accessory adapter body is a male member and the first engaging member of the body member is a female member, the female member slidingly engaging with the male member of the adapter body.

11. The accessory adapter of claim 1, wherein the body member and the clamping member are integrally formed.

12. The accessory adapter of claim 1, wherein the body member is removably attachable to the clamping member.

13. The accessory adapter of claim 1, further comprising a fastener removably attaching the body member with the clamping member.

14. The accessory adapter of claim 1, further comprising a fastener removably attaching the accessory adapter body with the body member.

15. An accessory adapter in combination with a cargo accessory basket attachable to a vehicle, the accessory adapter comprising:
    a first clamping member, the first clamping member having a first engaging member monolithically formed with the first clamping member;
    a second clamping member removably attached to the first clamping member, wherein the cargo accessory basket is secured between the first and second clamping members;
    an accessory member removably attached to the first engaging member of the first clamping member, wherein the accessory member secures an accessory; and
    a strap member spaced from the accessory member and removably securable directly to the cargo accessory basket, the strap member being free of direct connection with the accessory member, wherein the strap member and the accessory member are operatively positioned on the cargo accessory basket to hold the accessory, the strap member and the accessory member being free of an elongated rail member positioned in the cargo accessory basket, and the strap member is selectively attachable to the accessory.

16. The accessory adapter of claim 15, wherein the cargo accessory basket includes at least one rail and a storage compartment.

17. The accessory adapter of claim 16, wherein the accessory member is positioned on the rail of the cargo accessory basket to permit use of at least a portion of the storage compartment.

18. The accessory adapter of claim 16, wherein the strap is removably securable to a tire of a bicycle.

19. The accessory adapter of claim 16, wherein attachment of the first and second clamping members forms a channel, wherein the rail is wedgingly secured within the channel.

20. The accessory adapter of claim 19, wherein the first clamping member includes a generally T-shaped female member.

21. The accessory adapter of claim 20, wherein the second clamping member includes a generally T-shaped male member, the generally T-shaped male member slidingly engaging the generally T-shaped female member of the first clamping member.

22. The accessory adapter of claim 21, wherein the accessory member includes a generally T-shaped male member.

23. The accessory adapter of claim 22, wherein the first engaging member includes a second generally T-shaped female member, the second generally T-shaped female member selectively engaging the generally T-shaped male member of the accessory member.

24. An accessory adapter in combination with a cargo accessory basket, the accessory adapter comprising:

a body having first and second attachment members, wherein the second attachment member is monolithically formed with the body;

a clamping device having a third attachment member, wherein the third attachment member removably attaches to the first attachment member, wherein a portion of the cargo accessory basket is wedgingly secured between the body and clamping device;

an accessory holding device having a fourth attachment member, wherein the fourth attachment member removably attaches to the second attachment member; and a strap member spaced from the accessory holding device and removably securable directly to the cargo accessory basket, the strap member being free of direct connection with the accessory holding device, wherein the strap member and the accessory holding device are operatively positioned on the cargo accessory basket, the strap member and the accessory holding device being free of an elongated rail member positioned in the cargo accessory basket, wherein the accessory holding device and strap member are capable of holding an accessory.

25. The accessory adapter of claim 24, wherein the body and clamping device wedgingly engage the cargo accessory basket removably securing the body and clamping device to the cargo accessory basket.

26. The accessory adapter of claim 24, wherein the accessory holding device and strap member are capable of holding a bicycle.

27. The accessory adapter of claim 24, wherein the third attachment member removably attaches to the first attachment member by sliding engagement.

28. The accessory adapter of claim 24, wherein the fourth attachment member removably attaches to the second attachment member by sliding engagement.

29. The accessory adapter of claim 24, wherein the first attachment member is a female member and the third attachment member is a male member, the male member slidingly engaging the female member.

30. The accessory adapter of claim 24, wherein the second attachment member is a female member and the fourth attachment member is a male member, the male member slidingly engaging the female member.

31. A system comprising:
a cargo accessory basket selectively attachable to a vehicle, the cargo accessory basket having at least one rail;
a body member having a first engaging member monolithically formed with the body member;
a clamping member selectively attached to the body member, wherein the rail of the cargo accessory basket is wedgingly secured between the clamping member and body member;
an accessory adapter body selectively attached to the first engaging member of the body member, wherein the accessory adapter body includes a bicycle attachment portion configured to selectively secure a bicycle to the accessory adapter body;
a strap spaced from the accessory adapter body, the strap configured to secure a tire of the bicycle, wherein the strap is directly secured to a floor of the cargo basket.

32. The system of claim 31, wherein the bike attachment portion is configured to secure forks of a bicycle to the accessory adapter body.

33. A system comprising:
a cargo accessory basket selectively attachable to a vehicle, the cargo accessory basket having at least one rail and a floor;
a body member having a first engaging member;
a clamping member selectively attached to the body member, wherein the rail of the cargo accessory basket is wedgingly secured between the clamping member and body member;
an accessory adapter body selectively attached to the first engaging member of the body member, wherein the accessory adapter body includes a bicycle attachment portion; and
a strap spaced from the accessory adapter body, the strap configured to secure a tire of the bicycle, wherein the strap is directly secured to the floor of the cargo accessory basket.

34. The system of claim 33, wherein the strap and accessory adapter body are operatively positioned on the cargo accessory basket, the strap and accessory adapter body being free of an elongated rail member positioned in the cargo accessory basket.

* * * * *